United States Patent
Lindell (10) Patent No.: US 11,248,539 B2
(45) Date of Patent: Feb. 15, 2022

(54) METHOD FOR CONTROLLING AN INTERNAL COMBUSTION ENGINE DURING UNCONTROLLED COMBUSTION THEREIN

(71) Applicant: Scania CV AB, Södertälje (SE)

(72) Inventor: Martin Lindell, Nynäshamn (SE)

(73) Assignee: Scania CV AB, Södertälje (SE)

( * ) Notice: Subject to any disclaimer, the term of this patent is extended or adjusted under 35 U.S.C. 154(b) by 242 days.

(21) Appl. No.: 16/310,742

(22) PCT Filed: May 30, 2017

(86) PCT No.: PCT/SE2017/050571
§ 371 (c)(1),
(2) Date: Dec. 17, 2018

(87) PCT Pub. No.: WO2017/222443
PCT Pub. Date: Dec. 28, 2017

(65) Prior Publication Data
US 2019/0178169 A1 Jun. 13, 2019

(30) Foreign Application Priority Data
Jun. 22, 2016 (SE) .................... 1650885-5

(51) Int. Cl.
*F02D 17/04* (2006.01)
*F02D 41/22* (2006.01)
(Continued)

(52) U.S. Cl.
CPC .............. *F02D 17/04* (2013.01); *F02D 9/06* (2013.01); *F02D 31/006* (2013.01); *F02D 41/22* (2013.01);
(Continued)

(58) Field of Classification Search
CPC .......... F02D 17/04; F02D 9/06; F02D 31/006; F02D 41/22; F02D 2041/227;
(Continued)

(56) References Cited

U.S. PATENT DOCUMENTS 4,192,279 A * 3/1980 Maisch ............... F02N 11/0818
  123/198 F
4,267,807 A * 5/1981 Ashfield ................. F02B 77/08
  123/198 D
(Continued)

FOREIGN PATENT DOCUMENTS

DE     102009028777      10/2013
EP       1860304 A1      11/2007
(Continued)

OTHER PUBLICATIONS

Scania CV AB, Chinese Application No. 201780036726.2, First Office Action, dated Dec. 16, 2020.
(Continued)

*Primary Examiner* — Hung Q Nguyen
(74) *Attorney, Agent, or Firm* — Moore & Van Allen PLLC; W. Kevin Ransom (57) ABSTRACT

Methods, systems, and computer program products are provided for controlling an internal combustion that comprises a cylinder having a space arranged to receive air and fuel, a piston disposed in the cylinder, and a crankcase being in fluid communication with the cylinder. The method comprises determining an uncontrolled behavior due to fluid flow between said crankcase and said cylinder space and combustion of such fluid, which entails: determining whether a powertrain of the vehicle is disengaged; determining whether the engine speed is increasing; and determining whether said cylinder space is receiving fuel. The method further comprises determining that an uncontrolled behavior is occurring if the conditions that: said powertrain
(Continued)

is disengaged, the engine speed is increasing and said cylinder space is not receiving any fuel, are fulfilled.

14 Claims, 5 Drawing Sheets (51) Int. Cl.
F02P 11/02 (2006.01)
F02D 31/00 (2006.01)
F02D 9/06 (2006.01)
(52) U.S. Cl.
CPC ........ *F02P 11/02* (2013.01); *F02D 2041/227* (2013.01); *F02D 2200/101* (2013.01); *F02D 2200/1012* (2013.01); *F02D 2250/08* (2013.01); *Y02T 10/40* (2013.01)
(58) Field of Classification Search
CPC ....... F02D 2200/101; F02D 2200/1012; F02D 2250/08; F02D 2200/0614; F02P 11/02; Y02T 10/40; F02B 77/08
See application file for complete search history.

(56) References Cited

U.S. PATENT DOCUMENTS

| | | | | |
|---|---|---|---|---|
| 5,171,176 A * | 12/1992 | Gebhardt | ............... | B63H 23/08 440/75 |
| 5,388,562 A | 2/1995 | Sekiguchi et al. | | |
| 5,445,248 A * | 8/1995 | Clarke | ............... | F02D 9/06 137/312 |
| 6,152,853 A * | 11/2000 | Banks, III | ............. | B60W 30/18 477/119 |
| 6,429,540 B1 * | 8/2002 | Dunsworth | ........... | F02D 31/009 123/352 |
| 7,315,778 B1 * | 1/2008 | Kumar | ................ | F02D 41/1497 123/357 |
| 2003/0094157 A1 | 5/2003 | Tachibana et al. | | |
| 2005/0079953 A1 | 4/2005 | Zieles et al. | | |
| 2005/0177288 A1 * | 8/2005 | Sullivan | ............... | B60W 50/02 701/36 |
| 2008/0316009 A1 * | 12/2008 | Nagata | ............... | G01C 21/3697 340/438 |
| 2010/0114454 A1 * | 5/2010 | French | ................... | F01M 1/16 701/102 |
| 2010/0168976 A1 | 7/2010 | Andrasko et al. | | |
| 2013/0087111 A1 | 4/2013 | Brennan | | |
| 2013/0213344 A1 * | 8/2013 | Stender | ................... | F02D 45/00 123/198 D |
| 2013/0269654 A1 | 10/2013 | Xiao et al. | | |
| 2014/0012435 A1 * | 1/2014 | Sugihara | ................... | B60L 3/12 701/2 |
| 2014/0107902 A1 * | 4/2014 | Shiono | ................ | F02N 11/0803 701/99 |
| 2015/0000635 A1 * | 1/2015 | Nishio | ................ | F02D 41/3011 123/332 |
| 2015/0314727 A1 * | 11/2015 | Marunaka | ................ | B60K 6/22 340/441 |
| 2016/0146128 A1 * | 5/2016 | Tu | ........................ | F02D 37/02 701/113 |

FOREIGN PATENT DOCUMENTS

| | | | | |
|---|---|---|---|---|
| EP | 0921295 | | 10/2013 | |
| FR | 2857913 A1 | * | 1/2005 | |
| FR | 2918115 A1 | | 1/2009 | |
| FR | 2981987 | | 1/2009 | |
| JP | 2003165354 A | | 6/2003 | |
| JP | 2003240023 A | | 8/2003 | |
| JP | 2005042722 A | * | 2/2005 | ............. F01P 11/14 |
| JP | 2012092788 A | | 5/2012 | |
| JP | 2016075267 A | | 5/2016 | |
| KR | 20050035340 A | | 4/2005 | |
| KR | 20060069897 A | | 6/2006 | |
| SE | 520888 C2 | | 9/2003 | |
| SE | 1150964 A1 | | 4/2013 | |
| WO | 2017039447 A1 | | 3/2017 | |

OTHER PUBLICATIONS

International Preliminary Report on Patentability for International Patent Application No. PCT/SE2017/050571 dated Dec. 25, 2018.
International Search Report for International Patent Application No. PCT/SE2017/050571 dated Aug. 22, 2017.
Swedish Office Action for Swedish Patent Application No. 1650885-5 dated Feb. 6, 2017.
Written Opinion for International Patent Application No. PCT/SE2017/050571 dated Aug. 22, 2017.
Scania CV AB, European Application No. 17815803.6, Extended European Search Report, dated Jan. 30, 2020.
Scania CV AB, Korean Application No. 10-2019-7000437, Office Action, dated Dec. 19, 2019.

* cited by examiner

METHOD FOR CONTROLLING AN INTERNAL COMBUSTION ENGINE DURING UNCONTROLLED COMBUSTION THEREIN

CROSS-REFERENCE TO RELATED APPLICATIONS

This application is a national stage application (filed under 35 § U.S.C. 371) of PCT/SE2017/050571, filed May 30, 2017 of the same title, which, in turn, claims priority to Swedish Application No. 1650885-5 filed Jun. 22, 2016; the contents of each of which are hereby incorporated by reference.

FIELD OF THE INVENTION

The invention relates to a method for controlling an internal combustion engine of a vehicle according to the preamble of claim 1. The invention also relates to a system for controlling an internal combustion engine of a vehicle. The invention also relates to a vehicle. The invention in addition relates to a computer program and a computer program product.

BACKGROUND OF THE INVENTION

A diesel engine comprises a cylinder having a space arranged to receive air and fuel, a piston disposed in the cylinder, and a crankcase being in fluid communication with the cylinder. An uncontrolled behavior due to fluid flow between the crankcase and the cylinder space and combustion of such fluid may occur. The risk increases for engines having a closed crankcase since the fluid flow, e.g. gases, are returned to the inlet of the cylinder.

If such an uncontrolled behavior occurs it may cause severe damages to the engine and may result in a fire. Therefore there is a need to detect uncontrolled behavior in time and perform an emergency stop such that engine operation is terminated. Depending on the position of the vehicle the termination of engine operation may result in a safety issue.

A known way of determining uncontrolled behavior is to look at the engine speed, wherein uncontrolled behavior is determined when the engine speed has reached a certain high level. A problem with detecting uncontrolled behavior based upon the engine speed having reached a certain high level is that the level needs to be sufficiently high in order to be able to operate the vehicle at relatively high engine speeds, this resulting in detection at such a certain high level, e.g. about 2900 rpm, at which engine speed level it may be very difficult to prevent severe failure. It may even be too late to prevent severe failure which may cause fire in the engine.

US2013087111 discloses a method for controlling an internal combustion engine, wherein a controller coupled to an actuator is configured to close a valve for controlling flow of air into a cylinder of the engine when an uncontrolled condition for the engine is determined. US2013087111 further discloses determining such uncontrolled condition by e.g. monitoring engine acceleration or torque along with parameters including vehicle weight and road grade.

There is however a need for improving control of an internal combustion engine of a vehicle so as to improve safety in connection to an uncontrolled behavior of the engine.

SUMMARY OF THE INVENTION

An object of the present invention is to provide a method for controlling an internal combustion engine of a vehicle which facilitates improving safety in connection to an uncontrolled behavior of the engine.

An object of the present invention is to provide a system for controlling an internal combustion engine of a vehicle which facilitates improving safety in connection to an uncontrolled behavior of the engine.

These and other objects, apparent from the following description, are achieved by a method, a system, a vehicle, a computer program and a computer program product, as set out in the appended independent claims. Preferred embodiments of the method and the system are defined in appended dependent claims.

Specifically an object of the invention is achieved by a method for controlling an internal combustion engine of a vehicle. The combustion engine comprises a cylinder having a space arranged to receive air and fuel, a piston disposed in the cylinder, and a crankcase being in fluid communication with the cylinder. The method comprises the step of determining an uncontrolled behavior due to fluid flow between said crankcase and said cylinder space and combustion of such fluid. If an uncontrolled behavior has been determined, the method comprises the steps of: determining whether the vehicle is in a safe position, and, if the vehicle is in a safe position, performing an emergency stop, and; if the vehicle is not in a safe position, operating the engine in order to reposition said vehicle by controlling the exhaust brake of the vehicle by intermittently activating and deactivating said exhaust brake.

The exhaust brake is intermittently activated and deactivated and thus regulated about a certain engine speed. Such an engine speed may be in any suitable range in is according to an embodiment in the range of about 1300 rpm. Said engine speed is enough to be able to activate the gear box, put in a gear and make the vehicle move and reposition to a safe position. Thus, the engine is operated and said vehicle is repositioned by said activation and deactivation of said exhaust brake.

Hereby safety is improved in that it is facilitated to drive and hence reposition the vehicle from an unsafe position by the intermittent activation and deactivation of the exhaust brake thus providing a limp-home function.

According to an embodiment of the method the step of operating the engine by controlling the exhaust brake of the vehicle by intermittently activating and deactivating said exhaust brake is performed by activating said exhaust brake at a certain high engine speed and deactivating said exhaust brake at a certain low engine speed. The certain high engine speed is according to an embodiment a predetermined high engine speed and the certain low engine speed a predetermined low engine speed. The engine speed may be regulated about a certain engine speed wherein the high engine speed corresponds to a certain engine speed above the certain engine speed about which the regulation takes place and the certain low engine speed corresponds to a certain engine speed below the certain engine speed about which the regulation takes place. The high engine speed may be about 100 rpm above the certain engine speed about which the regulation takes place and the low engine speed about 100 rpm above the certain engine speed about which the regulation takes place.

According to an embodiment of the method the step of operating the engine by controlling the exhaust brake of the vehicle by intermittently activating and deactivating said exhaust brake is performed such that the engine is operated in order to move said vehicle to a safe position, wherein the step of performing an emergency stop is performed when the vehicle is in a safe position. Hereby safety is improved.

According to an embodiment of the method the step of performing an emergency stop comprises the step of activating a throttle valve so as to stop the flow of air to said cylinder space and/or activating the exhaust brake. By activating a throttle valve a very quick an efficient way of performing an emergency stop terminating the uncontrolled behavior is obtained.

According to an embodiment of the method the step of determining whether the vehicle is in a safe position comprises the step of determining whether the vehicle speed is below a certain speed and/or the step of determining whether the parking brake is activated and/or determining whether the ignition is broken and/or determining whether the ignition is deactivated. The term "ignition is broken" refers to the operator having tried to turn off the ignition e.g. by turning the ignition key or similar actuator. According to an embodiment the condition that the vehicle speed is very low/zero needs to be fulfilled. A safe position, i.e. indication of no intention from the operator of the vehicle to move the vehicle, is determined if the speed is very low/zero and/or the parking brake is activated. The step of determining whether the vehicle is in a safe position may comprises any suitable means for determining the position of the vehicle such as a Global Navigation Satellite System, GNSS, e.g. a global positioning system, GPS, for continuously determining the position of the vehicle and/or any suitable detector unit for detecting the surrounding of the vehicle and/or manually by an operator of the vehicle.

According to an embodiment of the method the step of determining an uncontrolled behavior comprises the steps of: determining whether the powertrain is disengaged; determining whether the engine speed is increasing; and determining whether said cylinder space is receiving fuel; wherein an uncontrolled behavior is at hand if the conditions that: said powertrain is disengaged, the engine speed is increasing and said cylinder space is not receiving any fuel, are fulfilled.

By thus using said conditions comprising the condition that the powertrain shall be disengaged it can by high certainty be determined that an increase in engine speed is due to an uncontrolled behavior which then may be determined in due time to prevent severe failure of the engine.

According to an embodiment of the method the step of determining an uncontrolled behavior comprises the step of determining the time period the engine speed is increasing for an increasing engine speed condition, wherein an uncontrolled behavior is fulfilled if said conditions further comprises that the condition that the engine speed is increasing is fulfilled during a predetermined time period. The method thus comprises the step of determining whether the condition that the engine speed is increasing is fulfilled during a predetermined time period. Hereby a more robust determination of an uncontrolled behavior is obtained thus reducing the risk of erroneously determining an uncontrolled behavior.

According to an embodiment of the method the step of determining an uncontrolled behavior comprises the step of determining the time period the cylinder space is not receiving any fuel for a non-receiving fuel condition, wherein an uncontrolled behavior is fulfilled if said conditions further comprises that the condition that the cylinder space is not receiving any fuel is fulfilled during a predetermined time period. The method thus comprises the step of determining whether the condition that the cylinder space is not receiving any fuel is fulfilled during a predetermined time period. Hereby a more robust determination of an uncontrolled behavior is obtained thus reducing the risk of erroneously determining an uncontrolled behavior.

According to an embodiment of the method the step of determining an uncontrolled behavior comprises the step of determining the resulting engine speed for an increasing engine speed condition, wherein an uncontrolled behavior is fulfilled if said conditions further comprises that the condition that the engine speed is increasing has resulted in a predetermined engine speed. The method thus comprises the step of determining whether the condition that the engine speed is increasing has resulted in a predetermined engine speed. Hereby a more robust determination of an uncontrolled behavior is obtained thus reducing the risk of erroneously determining an uncontrolled behavior.

According to an embodiment the method the step of determining an uncontrolled behavior comprises the step of integrating the engine acceleration during an increasing engine speed condition, wherein an uncontrolled behavior is fulfilled if said conditions further comprises that engine speed has reached a certain level. Herby a fast engine speed increase will result in a quicker determination of uncontrolled behavior than a slow engine increase.

Above, an embodiment of determining an uncontrolled behavior where a condition involves the powertrain being disengaged has been described. However, an uncontrolled behavior may be determined in any suitable way including determining an uncontrolled behavior when the powertrain is engaged, before performing a limp-home, i.e. operating the engine by controlling the exhaust brake of the vehicle by intermittently activating and deactivating said exhaust brake if the vehicle is not in a safe position.

Specifically an object of the invention is achieved by a system for controlling an internal combustion engine of a vehicle. The combustion engine comprises a cylinder having a space arranged to receive air and fuel, a piston disposed in the cylinder, and a crankcase being in fluid communication with the cylinder. The system comprises means for determining an uncontrolled behavior due to fluid flow between said crankcase and said cylinder space and combustion of such fluid. For a determined uncontrolled behavior the system comprises means for determining whether the vehicle is in a safe position, means for performing an emergency stop if the vehicle is in a safe position; and means for operating the engine and reposition said vehicle by controlling the exhaust brake of the vehicle by intermittently activating and deactivating said exhaust brake if the vehicle is not in a safe position.

According to an embodiment of the system the means for operating the engine by controlling the exhaust brake of the vehicle by intermittently activating and deactivating said exhaust brake comprises means for activating said exhaust brake at a certain high engine speed and means for deactivating said exhaust brake at a certain low engine speed.

According to an embodiment of the system the means for operating the engine by controlling the exhaust brake of the vehicle by intermittently activating and deactivating said exhaust brake is arranged to be performed such that the engine is operated in order to move said vehicle to a safe position, wherein the means for performing an emergency stop is arranged to be activated when the vehicle is in a safe position.

According to an embodiment of the system the means for performing an emergency stop comprises the means for activating a throttle valve so as to stop the flow of air to said cylinder space and/or means for activating an exhaust brake.

According to an embodiment of the system the means for determining whether the vehicle is in a safe position comprise means for determining whether the vehicle speed is below a certain speed and/or means for determining whether the parking brake is activated and/or means for determining whether the ignition is deactivated.

According to an embodiment of the system the means for determining an uncontrolled behavior comprises means for determining whether the powertrain is disengaged; means for determining whether the engine speed is increasing; and means for determining whether said cylinder space is receiving fuel; further comprising means for determining that an uncontrolled behavior is at hand if the conditions that: said powertrain is disengaged, the engine speed is increasing and said cylinder space is not receiving any fuel, are fulfilled.

According to an embodiment of the system the means for determining an uncontrolled behavior comprises means for determining the time period the engine speed is increasing for an increasing engine speed condition, wherein an uncontrolled behavior is fulfilled if said conditions further comprises that the condition that the engine speed is increasing is fulfilled during a predetermined time period. The system thus comprises means for determining whether the condition that the engine speed is increasing is fulfilled during a predetermined time period.

According to an embodiment of the system the means for determining an uncontrolled behavior comprises means for determining the time period the cylinder space is not receiving any fuel for a non-receiving fuel condition, wherein an uncontrolled behavior is fulfilled if said conditions further comprises that the condition that the cylinder space is not receiving any fuel is fulfilled during a predetermined time period. The system thus comprises means for determining whether the condition that the cylinder space is not receiving any fuel is fulfilled during a predetermined time period.

According to an embodiment of the system the means for determining an uncontrolled behavior comprises means for determining the resulting engine speed for an increasing engine speed condition, wherein an uncontrolled behavior is fulfilled if said conditions further comprises that the condition that the engine speed is increasing has resulted in a predetermined engine speed. The system thus comprises means for determining whether the condition that the engine speed is increasing has resulted in a predetermined engine speed.

The system for controlling an internal combustion engine of a vehicle is adapted to perform the method as set out herein.

The system according to the invention has the advantages according to the corresponding method.

Specifically an object of the invention is achieved by a vehicle comprising a system according to the invention as set out herein.

Specifically an object of the invention is achieved by a computer program for controlling an internal combustion engine of a vehicle, said computer program comprising program code which, when run on an electronic control unit or another computer connected to the electronic control unit, causes the electronic control unit to perform the method according to the invention.

Specifically an object of the invention is achieved by a computer program product comprising a digital storage medium storing the computer program.

BRIEF DESCRIPTION OF THE DRAWINGS

For a better understanding of the present invention reference is made to the following detailed description when read in conjunction with the accompanying drawings, wherein like reference characters refer to like parts throughout the several views, and in which.

DETAILED DESCRIPTION OF THE INVENTION

Hereinafter the term "link" refers to a communication link which may be a physical connector, such as an optoelectronic communication wire, or a non-physical connector such as a wireless connection, for example a radio or microwave link.

Hereinafter the term "fluid" in connection to "fluid flow between the crankcase and the cylinder space" refers to any possible fluid that may occur comprising a gaseous fluid, a liquid fluid and/or a solid fluid. Gaseous fluid may e.g. comprise a volatile fuel such as ethanol having boiled and being returned to the cylinder space as a gas, and/or blow-by-gases, i.e. gases escaping past the piston from the cylinder space to the crankcase space. Liquid fluid may comprise engine oil which may be pressed through the crankcase ventilation/return pipe, due to high pressure in the crankcase which could be caused by blow-by gases.

Figure 3:
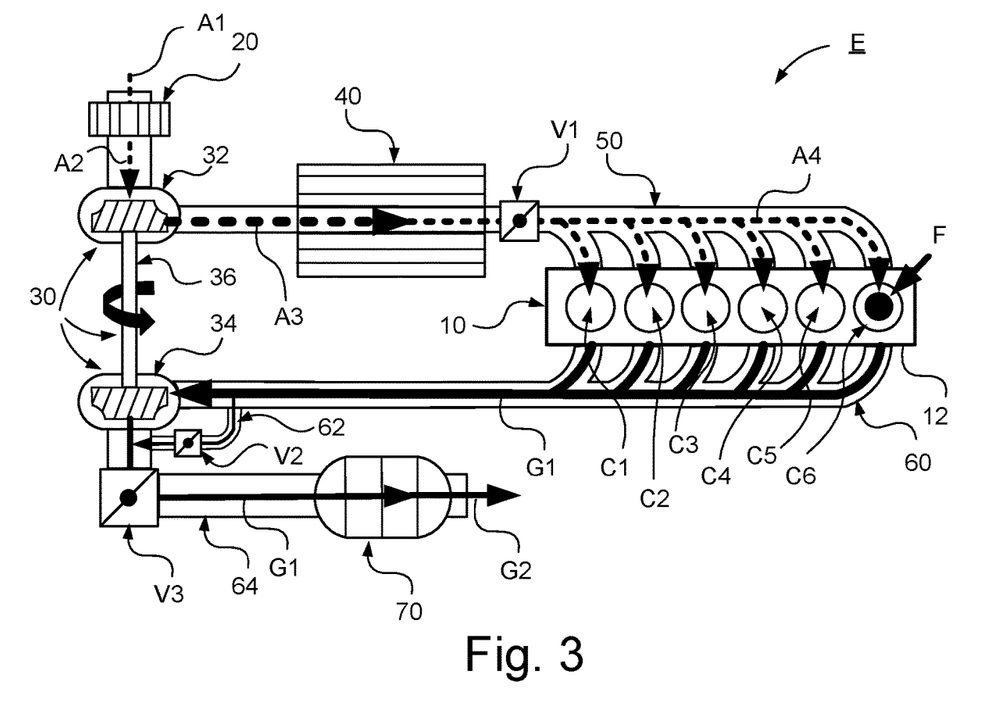
FIG. 3 schematically illustrates a turbocharged internal combustion engine according to an embodiment of the present invention.

The engine according to the present invention could be any suitable internal combustion engine with any suitable number of cylinders. The internal combustion engine according to the present invention could for example be a 5-cylinder engine, a 6-cylinder engine or an 8-cylinder engine. The cylinders could be in any suitable alignment, for example inline engine or a V-engine. In FIG. 3 an embodiment for a 6-cylinder engine is described.

Figure 1:
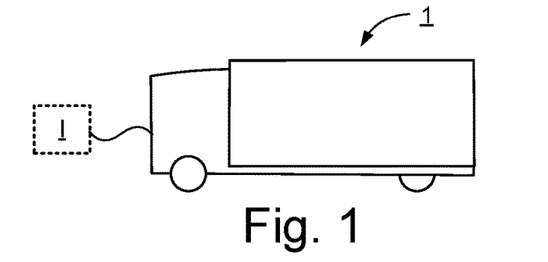
FIG. 1 schematically illustrates a side view of a vehicle according to the present invention.

FIG. 1 schematically illustrates a side view of a vehicle 1 according to the present invention. The exemplified vehicle 1 is a heavy vehicle in the shape of a truck. The vehicle according to the present invention could be any suitable vehicle such as a bus or a car. The vehicle is driven by means of an internal combustion engine. The vehicle 1 comprises a system I for controlling an internal combustion engine of the vehicle according to an embodiment of the present invention.

Figure 2:
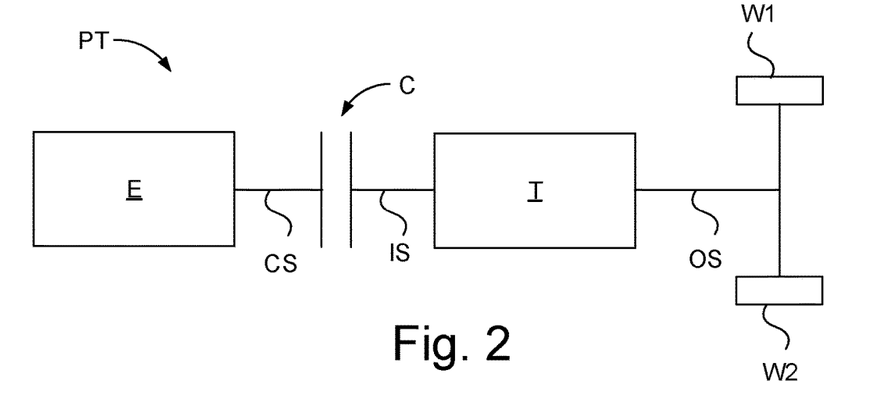
FIG. 2 schematically illustrates a powertrain for a vehicle according to an embodiment of the present invention.

FIG. 2 schematically illustrates a powertrain for a vehicle according to an embodiment of the present invention. The powertrain PT is according to an embodiment a powertrain of the vehicle 1 in FIG. 1.

The powertrain PT comprises an internal combustion engine E. The internal combustion engine E is a diesel engine. The internal combustion engine E has a closed crankcase configuration in which the fluid flow is returned to the inlet of the cylinder and back to the cylinder space.

The powertrain PT comprises a transmission T. The transmission T may be any suitable transmission comprising any suitable gearbox.

The powertrain PT comprises a clutch arrangement C. The clutch arrangement C is connected to the engine E via a crankshaft CS and a flywheel (not shown). The clutch arrangement C is connected to the transmission T. The clutch arrangement C is arranged to provide an engaged state in which power is transferred from the engine E to the transmission T for transmitting torque to at least one pair of tractive wheels W1, W2. The clutch arrangement C is arranged to provide a disengaged state in which the engine may be operated without affecting the tractive wheels W1, W2.

The powertrain PT for said vehicle 1 is thus configured to provide an engaged and a disengaged state.

FIG. 3 schematically illustrates a turbocharged diesel engine E.

In this example an engine E with six cylinders C1, C2, C3, C4, C5, C6 is shown. The engine E comprises an engine block 12 for housing the cylinders and other engine operation components.

The engine E is arranged to provide a four stroke cycle. The complete four stroke cycle forms a single thermodynamic cycle from which mechanical work will be extracted for operating a vehicle.

The strokes comprise an intake stroke filling the respective cylinder C1-C6 with air, a compression stroke where the air is compressed and at the end of which fuel is injected for combustion, here illustrated with injection of fuel F into cylinder C6, an expansion stroke where the combustion is completed and an exhaust stroke.

The engine E further comprises an air filter 20 through which ambient air A1 is arranged to pass so that filtered air A2 is obtained.

The engine E comprises a turbocharger 30 having a compressor 32, a turbine 34 and a shaft 36 operably connecting the compressor 32 and turbine 36. The compressor 32 is arranged to compress the filtered air A2 so that compressed air A3 is obtained.

The engine E comprises an intercooler 40 for cooling the compressed air A3 such that cooled compressed air A4 is obtained.

The engine E comprises an intake manifold 50 for distributing the air, i.e. the compressed air A4 to the cylinders C1-C6.

The engine E comprises a throttle valve V1 arranged to control the distribution of air A4 to the cylinders C1-C6. The engine E according to this embodiment comprises a throttle V1, however, the engine according to the present invention may be an engine without a throttle.

The engine E comprises an exhaust manifold 60 for distributing exhaust gas G1 from the cylinders C1-C6 to the turbine 34, the exhaust gas being arranged to pass the turbine 34 for operating the turbocharger 30 such that the compressor 32 compresses the filtered air A2.

The exhaust manifold 60 comprises a waste gate 62 for allowing exhaust gas to bypass the turbine 34 and further to the exhaust pipe 64. The engine E comprises a valve V2 arranged to control the distribution of exhaust gas through the waste gate 62.

The engine E comprises an exhaust brake V3 arranged downstream of the turbine and downstream of the waste gate. When activated, the exhaust brake V3 is configured to provide an exhaust back pressure by rendering exhaust gas flow through the exhaust pipe 64 more difficult. The exhaust back pressure is used for braking the engine speed. The exhaust back pressure thus created increases engine temperature due to the thus increased load. The exhaust back pressure may be used for increasing engine temperature and exhaust gas temperature, this being used at low engine speeds as the exhaust gases at low engine speeds do not reach high enough temperatures in order for the exhaust treatment to function efficiently. The exhaust brake V3 comprises a valve configuration for controlling the exhaust gas flow through the exhaust pipe 64.

The engine E comprises an exhaust treatment system 70 arranged to treat the exhaust gas in order to reduce emissions so that treated exhaust gases G2 exits the exhaust gas pipe 64.

FIG. 3 thus illustrates the gas flow through the turbocharged diesel engine E. Ambient air A1 enters through the air filter 20, is compressed in the compressor 32 and led through the intercooler 40 to the intake manifold 50 before entering the cylinders C1-C6. Fuel F is added by injection into the cylinders and after combustion, the exhaust gas G1 pass through the turbine 34 to the exhaust treatment system 70.

The respective cylinder C1-C6 thus has a space arranged to receive air A4 and fuel F. The engine E comprises a piston, not shown, disposed in the respective cylinder C1-C6, and a crankcase, not shown, being in fluid communication with the cylinder. The engine E has a closed crankcase configuration in which the fluid flow is returned to the inlet of the cylinder and back to the cylinder space. Such a configuration where the fluid is returned to the inlet of the cylinder is called a Closed Crankcase Ventilation, CCV. The engine according to this embodiment thus has a Closed Crankcase Ventilation, CCV, however the invention is not limited to such an engine but is applicable to any engine where such an uncontrolled behavior may occur. The risk of an uncontrolled behavior, however, increases with an engine having a Closed Crankcase Ventilation, CCV. An uncontrolled behavior due to fluid flow between the crankcase and the cylinder space and combustion of such fluid may occur and may be determined in accordance with the present invention as described with reference to e.g. FIGS. 6 and 7.

If an uncontrolled behavior has been determined it is determined whether the vehicle is in a safe position.

If the vehicle is in a safe position an emergency stop is performed. The emergency stop according to this embodiment involves closing the throttle valve V1 such that the flow of air to the cylinder C1-C6 is stopped resulting in the uncontrolled behavior being terminated due to lack of air for the combustion wherein the combustion is terminated. The emergency stop according to this embodiment may further involve activating the exhaust brake V3. For an engine not having a throttle valve, the emergency stop involves activating the exhaust brake V3.

If it is determined that the vehicle is not in a safe position, the engine E is operated by controlling the exhaust brake of the vehicle by intermittently activating and deactivating said exhaust brake V3. The exhaust brake V3 is intermittently activated and deactivated and thus regulated about a certain engine speed. The engine is operated by controlling the exhaust brake is performed by activating said exhaust brake V3 at a certain high engine speed and deactivating said exhaust brake V3 at a certain low engine speed.

Figures 4, 5A, 5B, 5C:
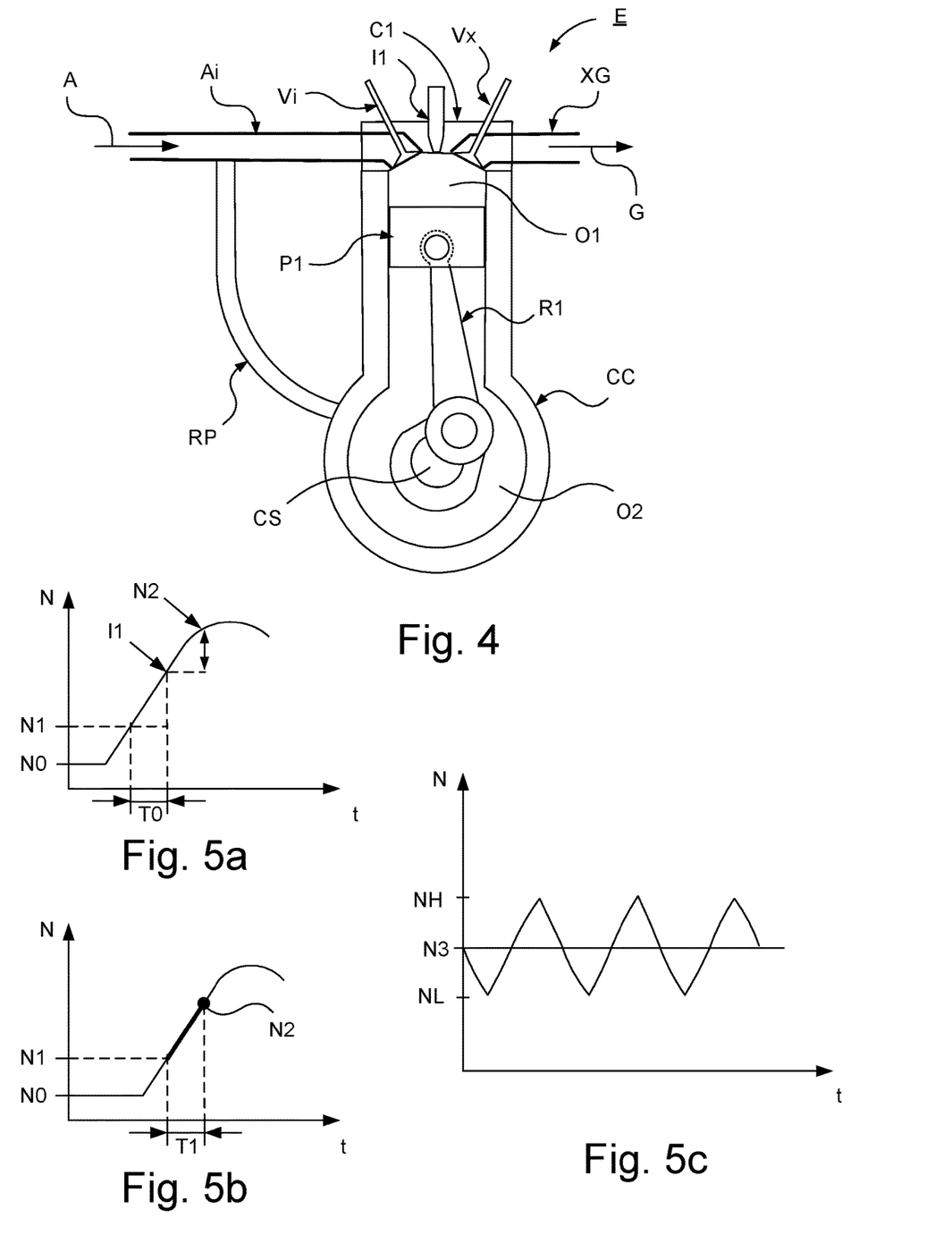
FIG. 4 schematically illustrates an internal combustion engine according to an embodiment of the present invention.
FIGS. 5a and 5b schematically illustrate engine speed over time approaching an uncontrolled behavior according to exemplary embodiments of the present invention.
FIG. 5c schematically illustrates control of engine speed by intermittent activation and deactivation of exhaust brake after a determined uncontrolled behavior according to an exemplary embodiment of the present invention.

FIG. 4 schematically illustrates an internal combustions engine E according to an embodiment of the present invention.

The internal combustion engine E is a diesel engine. The engine E comprises a cylinder C1. The cylinder C1 has a space O1 arranged to receive air A via an air intake Ai and fuel via a fuel injector I1.

The engine E comprises a piston P1 disposed in the cylinder C1.

The engine E comprises a crankshaft CS connected to a flywheel, not shown, a set of cylinders, of which one cylinder C1 is shown, being distributed along said crankshaft CS for rotating said crankshaft CS during operation of the engine.

The cylinder C1 is connected to the crankshaft via a connecting rod R1 connected to the piston P1 of the cylinder C1.

The engine E thus comprises fuel injectors for injecting fuel into the cylinder C1 for combustion, one fuel injector I1 being shown.

The engine E is arranged to provide a stroke cycle, e.g. a four stroke cycle, from which mechanical work will be extracted for operating a vehicle.

When the piston is farthest from the crankshaft CS is known as the top dead centre and when the piston P1 is closest to the crankshaft CS is known as the bottom dead centre.

The strokes comprise an intake stroke filling the cylinder C1 with air, a compression stroke where the air is compressed and at the end of which fuel is injected for combustion, an expansion stroke where the combustion is completed and an exhaust stroke.

The engine E comprises an exhaust outtake XG for releasing exhaust gas G. A valve Vx is disposed in the exhaust outtake XG for controlling flow of exhaust gas out of the cylinder space O1.

A valve Vi is disposed in the air intake Ai for controlling flow of air into the cylinder space O1.

The engine E comprises a crankcase CC for housing the crankshaft CS. The crankcase CC is in fluid communication with the cylinder C1. The crankcase CC has a space O2. The crankcase CC is a so called closed crankcase. The crankcase CC according to the embodiment shown in FIG. 4 is in fluid communication with the air intake Ai via return pipe RP.

An uncontrolled behavior due to fluid flow between the space O2 of the crankcase CC and the cylinder space O1 and combustion of such fluid in the space O1 may occur. The fluid flow may comprise unburned fuel and exhaust gases escaping around the piston P1 into the space O2.

Only one cylinder C1 with one piston P1 disposed is shown in FIG. 4 for ease of understanding. However, the engine E may comprise any suitable number of cylinders with pistons disposed therein.

FIG. 5a schematically illustrates engine speed N over time t approaching an uncontrolled behavior according to an exemplary embodiment of the present invention.

According to the invention determining an uncontrolled behavior comprises determining whether the powertrain is disengaged, determining whether the engine speed is increasing and determining whether said cylinder space is receiving fuel. If all these conditions are fulfilled, i.e. drivetrain is disengaged, engine speed is increasing and cylinder space is not receiving any fuel, it is determined that an uncontrolled behavior is at hand.

In FIG. 5a the powertrain is disengaged and cylinder space is not receiving any fuel. The engine speed starts to increase from an engine speed N0.

In order to be certain that an uncontrolled behavior is at hand the condition that the cylinder space is not receiving any fuel has to be fulfilled during a predetermined time period.

At the engine speed N0 the engine is controlled by an idle regulator being configured to control injection of fuel such that sufficient fuel is injected in order to keep the engine running at that engine speed. If an uncontrolled behavior then arises the engine speed will increase. The engine speed will then stop requesting fuel injection since it wants to lower the engine speed to the idle speed. According to an embodiment the determination of the cylinder space not receiving any fuel comprises determining that the idle regulator has stopped requesting fuel.

In order to be certain that an uncontrolled behavior is at hand the increasing engine speed must reach a predetermined engine speed N1 before it is considered as a possible approaching uncontrolled behavior.

According to an embodiment illustrated in FIG. 5a, in order to improve determination that an uncontrolled behavior is at hand, integration I1 of the engine acceleration is initiated at a certain time T0 after the predetermined engine speed N1 has been reached. When the engine speed has reached a certain level N2 an uncontrolled behavior is determined. Herby a fast engine speed increase will result in a quicker determination of uncontrolled behavior than a slow engine increase. As mentioned the other conditions, e.g. that the powertrain is disengaged and the cylinder space is not receiving fuel, need to be fulfilled.

According to an embodiment illustrated in FIG. 5b, in order to improve determination that an uncontrolled behavior is at hand, the condition that the engine speed is increasing from the predetermined engine speed N1 during a predetermined time period T1 should be fulfilled. Thus, in FIG. 5b, an uncontrolled behavior is determined at the point where the engine speed has increased from an engine speed N1 during a time period T1 to an engine speed N2. As mentioned the other conditions, e.g. that the powertrain is disengaged and the cylinder space is not receiving fuel, need to be fulfilled.

FIG. 5c schematically illustrates control of engine speed N by intermittent activation and deactivation of exhaust brake after a determined uncontrolled behavior according to an exemplary embodiment of the present invention.

Thus, If it is determined that the vehicle is not in a safe position, the engine is operated by controlling the exhaust brake of the vehicle by intermittently activating and deactivating the exhaust brake. The exhaust brake is intermittently activated and deactivated and thus regulated about a certain engine speed N3. The engine is operated by activating the exhaust brake at a certain high engine speed NH and deactivating the exhaust brake at a certain low engine speed NL.

Figure 6:
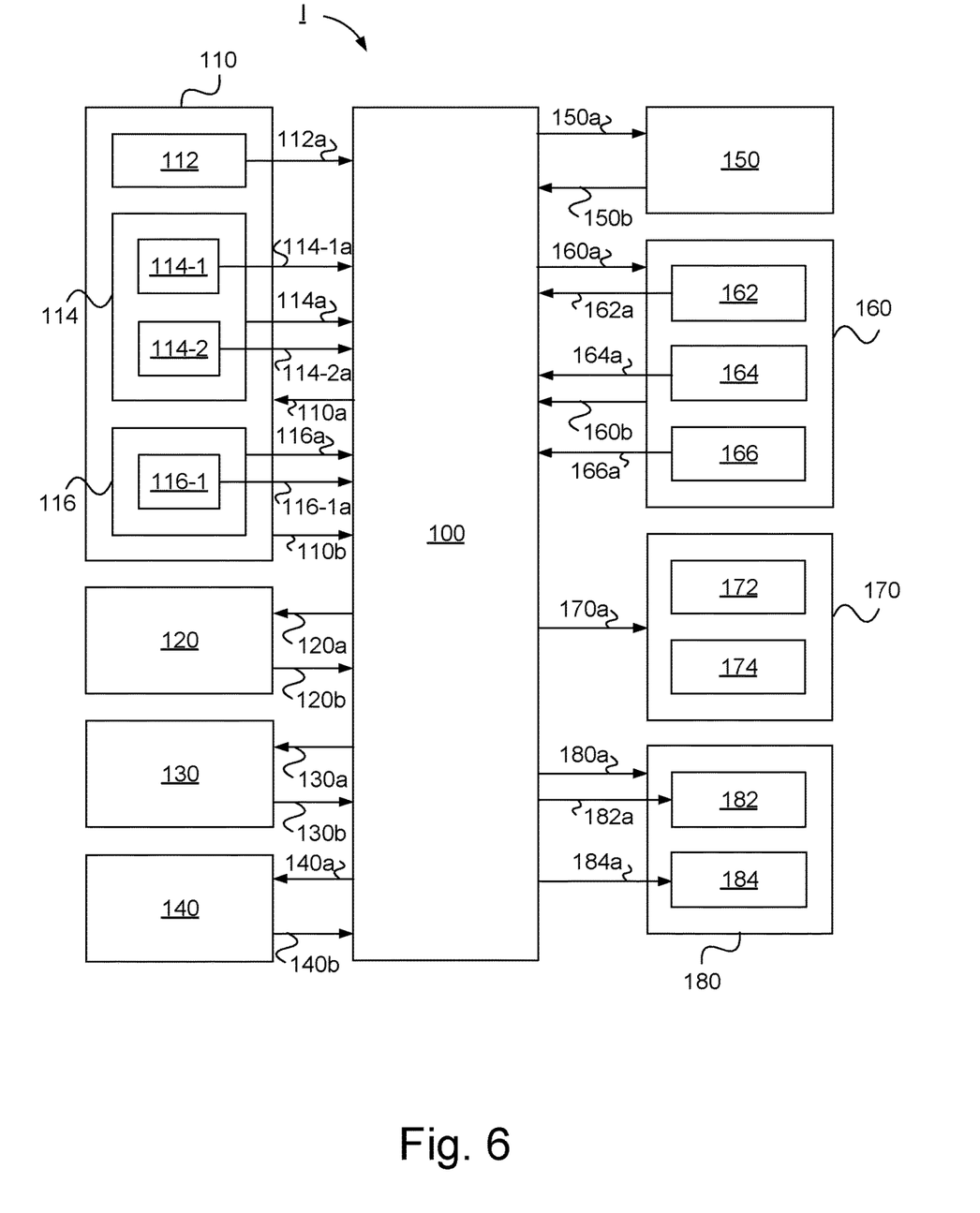
FIG. 6 schematically illustrates a system for controlling an internal combustion engine of a vehicle according to an embodiment of the present invention.

FIG. 6 schematically illustrates a system I for controlling an internal combustion engine of a vehicle according to an embodiment of the present invention.

The combustion engine comprises a cylinder having a space arranged to receive air and fuel, a piston disposed in the cylinder, and a crankcase being in fluid communication with the cylinder. The combustion engine could be the combustion engine E illustrated in FIGS. 2, 3 and 4. A powertrain for said vehicle is configured to provide an engaged and a disengaged state. The powertrain could e.g. be the powertrain in FIG. 2.

The system I comprises an electronic control unit 100.

The system I comprises means 110 for determining an uncontrolled behavior due to fluid flow between said crankcase and said cylinder space and combustion of such fluid.

The means 110 for determining an uncontrolled behavior comprises means 112 for determining whether the powertrain is disengaged. The means 112 for determining whether the powertrain is disengaged may comprise any suitable means comprising any suitable sensor.

The means 110 for determining an uncontrolled behavior comprises means 114 for determining whether the engine speed is increasing. The means 114 for determining whether the engine speed is increasing may comprise any suitable detector unit for detecting engine speed.

The means 110 for determining an uncontrolled behavior comprises means 116 for determining whether said cylinder space is receiving fuel. The means 116 for determining whether said cylinder space is receiving fuel comprises determining a non-request of fuel injection from the engine control unit.

The means 114 for determining whether the engine speed is increasing comprises means 114-1 for determining the time period the engine speed is increasing for an increasing engine speed condition. The means 110 for determining an uncontrolled behavior thus comprises means 114-1 for determining the time period the engine speed is increasing for an increasing engine speed condition. An uncontrolled behavior is fulfilled if said conditions further comprises that the condition that the engine speed is increasing is fulfilled during a predetermined time period.

The system I comprises means 120 for determining whether the condition that the engine speed is increasing is fulfilled during a predetermined time period.

The means 114 for determining whether the engine speed is increasing comprises means 114-2 for determining the resulting engine speed for an increasing engine speed condition. The means 110 for determining an uncontrolled behavior thus comprises means 114-2 for determining the resulting engine speed for an increasing engine speed condition. An uncontrolled behavior is fulfilled if said conditions further comprises that the condition that the engine speed is increasing has resulted in a predetermined engine speed.

The system I comprises means 130 for determining whether the condition that the engine speed is increasing has resulted in a predetermined engine speed.

The means 116 for determining whether said cylinder space is receiving fuel comprises means 116-1 for determining the time period the cylinder space is not receiving any fuel for a non-receiving fuel condition. The means 110 for determining an uncontrolled behavior thus comprises means 116-1 for determining the time period the cylinder space is not receiving any fuel for a non-receiving fuel condition. An uncontrolled behavior is fulfilled if said conditions further comprises that the condition that the cylinder space is not receiving any fuel is fulfilled during a predetermined time period.

The system I comprises means 140 for determining whether the condition that the cylinder space is not receiving any fuel is fulfilled during a predetermined time period.

The system I comprises means 150 for determining that an uncontrolled behavior is at hand if the conditions that: said powertrain is disengaged, the engine speed is increasing and said cylinder space is not receiving any fuel, are fulfilled.

The means 150 for determining that an uncontrolled behavior is at hand further comprises determining that the conditions that: the that the cylinder space is not receiving any fuel is fulfilled during a predetermined time period that the engine speed is increasing is fulfilled during a predetermined time period; the condition that the engine speed is increasing has resulted in a predetermined engine speed.

Above, an embodiment of means 110 for determining an uncontrolled behavior where a condition involves the powertrain being disengaged has been described. However, an uncontrolled behavior may be determined by any suitable means in any suitable way including means for determining an uncontrolled behavior when the powertrain is engaged, before performing a limp-home, i.e. operating the engine by controlling the exhaust brake of the vehicle by intermittently activating and deactivating said exhaust brake if the vehicle is not in a safe position.

The system comprises means 160 for automatically determining whether the vehicle is in a safe position.

The means 160 for determining whether the vehicle is in a safe position may comprise means for detecting parameters determining whether the vehicle speed is low/zero and/or means for determining whether the parking brake is activated and/or means for determining whether the ignition is deactivated. Said means for detecting may comprise any suitable sensor for detecting said parameters.

The means 160 for determining whether the vehicle is in a safe position comprises means 162 for determining whether the vehicle speed is below a certain speed. The means 162 for determining whether the vehicle speed is below a certain speed may comprise any suitable speed sensor. A safe position is determined if the speed is determined to be very low/zero, i.e. that the vehicle is in a stand-still.

The means 160 for determining whether the vehicle is in a safe position comprises means 164 for determining whether the parking brake is activated. The means 164 for determining whether the parking brake is activated may comprise any suitable sensor unit. A safe position is determined if the parking brake is activated.

The means 160 for determining whether the vehicle is in a safe position comprises means 166 for determining whether the ignition is deactivated. The means 166 for determining whether the ignition is deactivated may comprise any detection unit for detecting deactivation of ignition such as detecting deactivation by means of an ignition key or the like.

The means 160 for determining whether the vehicle is in a safe position may also comprises any suitable means for determining the position and the change of position of the vehicle such as a Global Navigation Satellite System, GNSS, e.g. a global positioning system, GPS, for continuously determining the position of the vehicle and/or any suitable detector unit for detecting the surrounding of the vehicle and/or manually by an operator of the vehicle.

The system comprises means 170 for performing an emergency stop if the vehicle is in a safe position.

The means 170 for performing an emergency stop comprises means 172 for activating a throttle valve so as to stop the flow of air to said cylinder space. Thus the means 172 is configured to close a throttle valve so as stop the flow of air to the cylinder and hence stopping the uncontrolled behavior.

The means 170 for performing an emergency stop comprises means 174 for activating an exhaust brake.

The system comprises means 180 for operating the engine by controlling the exhaust brake of the vehicle by intermittently activating and deactivating said exhaust brake if the vehicle is not in a safe position. The means for operating the engine by controlling the exhaust brake may comprise any suitable control unit. The means for operating the engine by controlling the exhaust brake is according to an embodiment comprised in the electronic control unit 100.

The means 180 for operating the engine by controlling the exhaust brake of the vehicle by intermittently activating and deactivating said exhaust brake comprises means 182 for activating said exhaust brake at a certain high engine speed and means 184 for deactivating said exhaust brake at a certain low engine speed.

The means 180 for operating the engine by controlling the exhaust brake of the vehicle by intermittently activating and deactivating said exhaust brake is arranged to be performed such that the vehicle is moved to a safe position, wherein the means 170 for performing an emergency stop is arranged to be activated when the vehicle is in a safe position.

The electronic control unit 100 is operably connected to the means 112 for determining whether the powertrain is disengaged via a link 112*a*. The electronic control unit 100 is via the link 112*a* arranged to receive a signal from said means 112 representing data whether the powertrain is disengaged.

The electronic control unit 100 is operably connected to the means 114 for determining whether the engine speed is increasing via a link 114*a*. The electronic control unit 100 is via the link 114*a* arranged to receive a signal from said means 114 representing data whether the engine speed is increasing.

The electronic control unit 100 is operably connected to the means 114-1 for determining the time period the engine speed is increasing for an increasing engine speed condition via a link 114-1*a*. The electronic control unit 100 is via the link 114-1*a* arranged to receive a signal from said means 114-1 representing data for time period the engine speed is increasing.

The electronic control unit 100 is operably connected to the means 120 for determining whether the condition that the engine speed is increasing is fulfilled during a predetermined time period via a link 120*a*. The electronic control unit 100 is via the link 120*a* arranged to send a signal to said means 120 representing data for time period the engine speed has been increasing.

The electronic control unit 100 is operably connected to the means 120 for determining whether the condition that the engine speed is increasing is fulfilled during a predetermined time period via a link 120*b*. The electronic control unit 100 is via the link 120*b* arranged to receive a signal from said means 120 representing data for engine speed increase being fulfilled during a predetermined time.

The electronic control unit 100 is operably connected to the means 114-2 for determining the resulting engine speed for an increasing engine speed condition via a link 114-2*a*. The electronic control unit 100 is via the link 114-2*a* arranged to receive a signal from said means 114-2 representing data for resulting engine speed.

The electronic control unit 100 is operably connected to the means 130 for determining whether the condition that the engine speed is increasing has resulted in a predetermined engine speed via a link 130*a*. The electronic control unit 100 is via the link 130*a* arranged to send a signal to said means 130 representing data for resulting engine speed.

The electronic control unit 100 is operably connected to the means 130 for determining whether the condition that the engine speed is increasing has resulted in a predetermined engine speed via a link 130*b*. The electronic control unit 100 is via the link 130*b* arranged to receive a signal from said means 130 representing data for engine speed increase having resulted in a predetermined engine speed.

The electronic control unit 100 is operably connected to the means 116 for determining whether said cylinder space is receiving fuel via a link 116*a*. The electronic control unit 100 is via the link 116*a* arranged to receive a signal from said means 116 representing data whether said cylinder space is receiving fuel.

The electronic control unit 100 is operably connected to the means 116-1 for determining the time period the cylinder space is not receiving any fuel for a non-receiving fuel condition via a link 116-1*a*. The electronic control unit 100 is via the link 116-1*a* arranged to receive a signal from said means 116 representing data time period the cylinder space is not receiving any fuel.

The electronic control unit 100 is operably connected to the means 140 for determining whether the condition that the cylinder space is not receiving any fuel is fulfilled during a predetermined time period via a link 140*a*. The electronic control unit 100 is via the link 140*a* arranged to send a signal to said means 140 representing data for time period cylinder space has not been receiving any fuel.

The electronic control unit 100 is operably connected to the means 140 for determining whether the condition that the cylinder space is not receiving any fuel is fulfilled during a predetermined time period via a link 140*b*. The electronic control unit 100 is via the link 140*b* arranged to receive a signal from said means 140 representing data for cylinder space not receiving any fuel being fulfilled during a predetermined time period.

The electronic control unit 100 is operably connected to the means 150 for determining that an uncontrolled behavior is at hand via a link 150*a*. The electronic control unit 100 is via the link 150*a* arranged to send signals to said means 150 representing data for conditions for uncontrolled behavior being fulfilled comprising data for powertrain disengaged, engine speed increasing and cylinder space not receiving any fuel. The data may further comprise data for cylinder space not receiving any fuel being fulfilled during a predetermined time period, engine speed increasing being fulfilled during a predetermined time period; and engine speed increasing having resulted in a predetermined engine speed.

The electronic control unit 100 is operably connected to the means 150 for determining that an uncontrolled behavior is at hand via a link 150*a*. The electronic control unit 100 is via the link 150*a* arranged to receive a signal from said means 150 representing data for determined uncontrolled behavior.

The electronic control unit 100 is operably connected to the means 160 for determining whether the vehicle is in a safe position via a link 160*a*. The electronic control unit 100 is via the link 160*a* arranged to send a signal to said means 160 representing data for determined uncontrolled behavior.

The electronic control unit 100 is operably connected to the means 160 for determining whether the vehicle is in a safe position via a link 160*b*. The electronic control unit 100 is via the link 160*b* arranged to receive a signal from said means 160 representing data for whether the vehicle is in a safe position.

The electronic control unit 100 is operably connected to the means 162 for determining whether the vehicle speed is below a certain speed via a link 162*a*. The electronic control unit 100 is via the link 162*a* arranged to receive a signal from said means 162 representing data for vehicle speed and whether the vehicle speed is below a certain speed/zero.

The electronic control unit 100 is operably connected to the means 164 for determining whether the parking brake is activated via a link 164a. The electronic control unit 100 is via the link 164a arranged to receive a signal from said means 164 representing data for whether the parking brake is activated.

The electronic control unit 100 is operably connected to the means 166 for determining whether the ignition is deactivated via a link 166a. The electronic control unit 100 is via the link 166a arranged to receive a signal from said means 166 representing data for whether ignition is deactivated.

The electronic control unit 100 is operably connected to the means 170 for performing an emergency stop if the vehicle is in a safe position via a link 170a. The electronic control unit 100 is via the link 170a arranged to send a signal to said means 170 representing data for vehicle being in a safe position. The data may comprise data for vehicle speed is below a certain speed and/or data for parking brake being activated.

The electronic control unit 100 is operably connected to the means 180 for operating the engine by controlling the exhaust brake of the vehicle by intermittently activating and deactivating said exhaust brake if the vehicle is not in a safe position via a link 180a. The electronic control unit 100 is via the link 180a arranged to send a signal to said means 180 representing data for vehicle being in an unsafe position.

The electronic control unit 100 is operably connected to means 182 for activating said exhaust brake at a certain high engine speed via a link 182a. The electronic control unit 100 is via the link 182a arranged to send a signal to said means 182 representing data for engine speed having reached a certain high engine speed.

The electronic control unit 100 is operably connected to means 184 for deactivating said exhaust brake at a certain low engine speed via a link 184a. The electronic control unit 100 is via the link 184a arranged to send a signal to said means 184 representing data for engine speed having reached a certain low engine speed.

Figure 7:
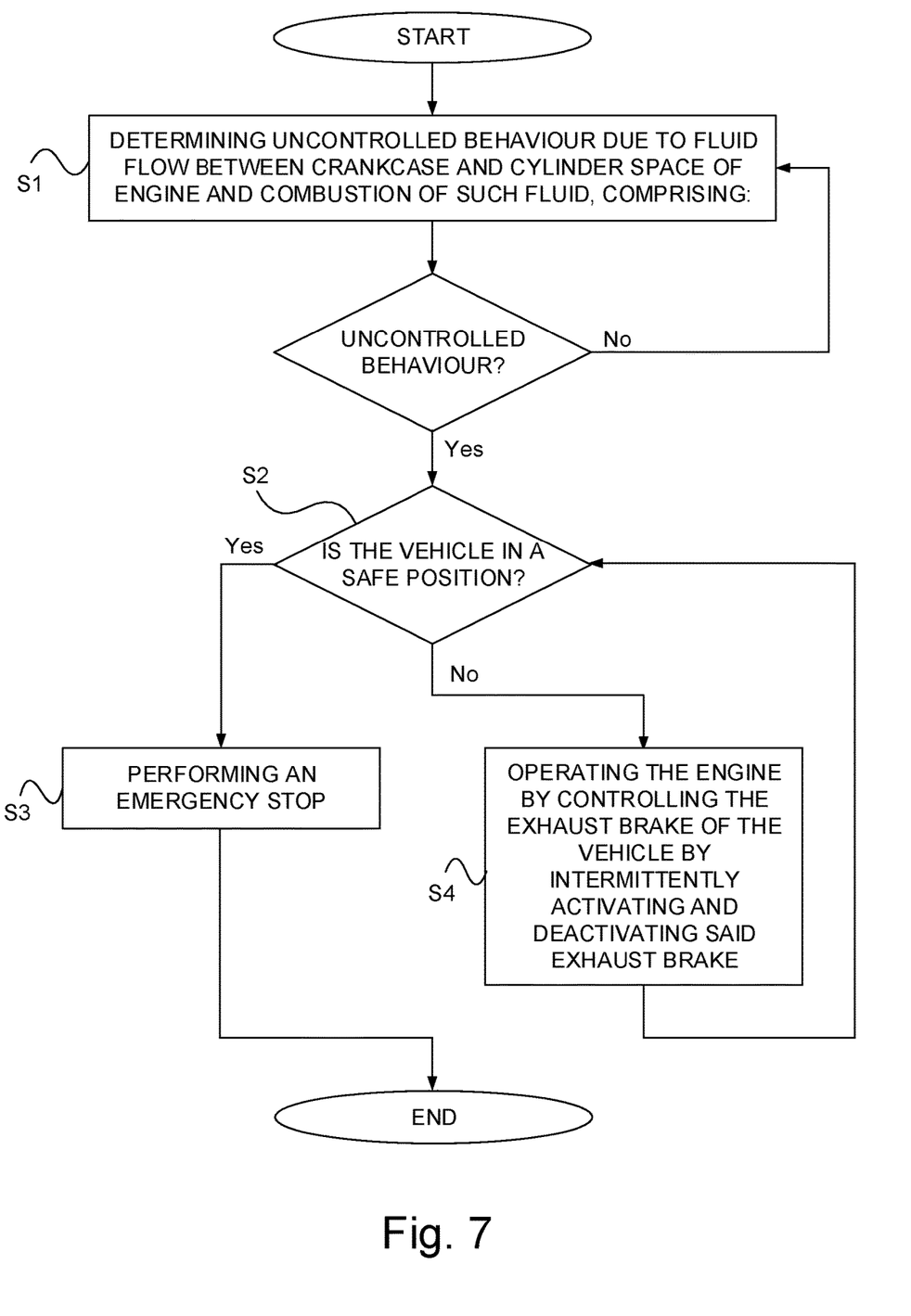
FIG. 7 schematically illustrates a block diagram of a method for controlling an internal combustion engine of a vehicle according to an embodiment of the present invention.

FIG. 7 schematically illustrates a block diagram of a method for controlling an internal combustion engine of a vehicle according to an embodiment of the present invention. The combustion engine comprises a cylinder having a space arranged to receive air and fuel, a piston disposed in the cylinder, and a crankcase being in fluid communication with the cylinder. A powertrain for said vehicle is configured to provide an engaged and a disengaged state.

According to the embodiment the method for controlling an internal combustion engine of a vehicle comprises a step S1. In this step an uncontrolled behavior due to fluid flow between said crankcase and said cylinder space and combustion of such fluid is determined.

According to the embodiment the method for controlling an internal combustion engine of a vehicle comprises a step S2. In this step, if an uncontrolled behavior has been determined, it is determined whether the vehicle is in a safe position.

According to the embodiment the method for controlling an internal combustion engine of a vehicle comprises a step S3. In this step, if the vehicle is in a safe position, an emergency stop is performed.

According to the embodiment the method for controlling an internal combustion engine of a vehicle comprises a step S4. In this step, if the vehicle is not in a safe position, the engine is operated by controlling the exhaust brake of the vehicle by intermittently activating and deactivating said exhaust brake.

The exhaust brake is intermittently activated and deactivated and thus regulated about a certain engine speed. Such an engine speed may be in any suitable range in is according to an embodiment in the range of about 1300 rpm.

Hereby safety is improved in that it is possible to drive and hence reposition the vehicle from an unsafe position only by the intermittent activation and deactivation of the exhaust brake thus providing a limp-home function.

According to an embodiment of the method the step S4 of operating the engine by controlling the exhaust brake of the vehicle by intermittently activating and deactivating said exhaust brake is performed by activating said exhaust brake at a certain high engine speed and deactivating said exhaust brake at a certain low engine speed. The certain high engine speed is according to an embodiment a predetermined high engine speed and the certain low engine speed a predetermined low engine speed. The engine speed may be regulated about a certain engine speed wherein the high engine speed corresponds to a certain engine speed above the certain engine speed about which the regulation takes place and the certain low engine speed corresponds to a certain engine speed below the certain engine speed about which the regulation takes place. The high engine speed may be about 100 rpm above the certain engine speed about which the regulation takes place and the low engine speed about 100 rpm above the certain engine speed about which the regulation takes place.

According to an embodiment of the method the step S4 of operating the engine by controlling the exhaust brake of the vehicle by intermittently activating and deactivating said exhaust brake is performed such that the vehicle is moved to a safe position, wherein the step of performing an emergency stop is performed when the vehicle is in a safe position.

According to an embodiment of the method the step of performing an emergency stop comprises the step of activating a throttle valve so as to stop the flow of air to said cylinder space and/or activating an exhaust brake. Hereby a very quick an efficient way of performing an emergency stop terminating the uncontrolled behavior is obtained.

According to an embodiment of the method the step S2 of determining whether the vehicle is in a safe position comprises the step of determining whether the vehicle speed is below a certain speed and/or the step of determining whether the parking brake is activated. A safe position, i.e. indication of no intention from the operator of the vehicle to move the vehicle, is determined if the speed is very low/zero and/or the parking brake is activated. The step of determining whether the vehicle is in a safe position may comprises any suitable means for determining the position of the vehicle such as a Global Navigation Satellite System, GNSS, e.g. a global positioning system, GPS, for continuously determining the position of the vehicle and/or any suitable detector unit for detecting the surrounding of the vehicle and/or manually by an operator of the vehicle.

According to an embodiment of the method the step S1 of determining an uncontrolled behavior comprises the steps of: determining whether the powertrain is disengaged; determining whether the engine speed is increasing; and determining whether said cylinder space is receiving fuel; wherein an un uncontrolled behavior is at hand if the conditions that: said powertrain is disengaged, the engine speed is increasing and said cylinder space is not receiving any fuel, are fulfilled.

By thus using said conditions comprising the condition that the powertrain shall be disengaged it can be high certainty be determined that an increase in engine speed is due to an uncontrolled behavior which then may be determined in due to prevent severe failure of the engine.

According to an embodiment of the method the step of determining an uncontrolled behavior comprises the step of determining the time period the engine speed is increasing for an increasing engine speed condition, wherein an uncontrolled behavior is fulfilled if said conditions further comprises that the condition that the engine speed is increasing is fulfilled during a predetermined time period. The method thus comprises the step of determining whether the condition that the engine speed is increasing is fulfilled during a predetermined time period. Hereby a more robust determination of an uncontrolled behavior is obtained thus reducing the risk of erroneously determining an uncontrolled behavior.

According to an embodiment of the method the step of determining an uncontrolled behavior comprises the step of determining the time period the cylinder space is not receiving any fuel for a non-receiving fuel condition, wherein an uncontrolled behavior is fulfilled if said conditions further comprises that the condition that the cylinder space is not receiving any fuel is fulfilled during a predetermined time period. The method thus comprises the step of determining whether the condition that the cylinder space is not receiving any fuel is fulfilled during a predetermined time period. Hereby a more robust determination of an uncontrolled behavior is obtained thus reducing the risk of erroneously determining an uncontrolled behavior.

According to an embodiment of the method the step of determining an uncontrolled behavior comprises the step of determining the resulting engine speed for an increasing engine speed condition, wherein an uncontrolled behavior is fulfilled if said conditions further comprises that the condition that the engine speed is increasing has resulted in a predetermined engine speed. The method thus comprises the step of determining whether the condition that the engine speed is increasing has resulted in a predetermined engine speed. Hereby a more robust determination of an uncontrolled behavior is obtained thus reducing the risk of erroneously determining an uncontrolled behavior.

According to an embodiment the method the step of determining an uncontrolled behavior comprises the step of integrating the engine acceleration during an increasing engine speed condition, wherein an uncontrolled behavior is fulfilled if said conditions further comprises that engine speed has reached a certain level. Hereby a fast engine speed increase will result in a quicker determination of uncontrolled behavior than a slow engine increase.

Above, an embodiment of determining an uncontrolled behavior where a condition involves the powertrain being disengaged has been described. However, an uncontrolled behavior may be determined in any suitable way including determining an uncontrolled behavior when the powertrain is engaged, before performing a limp-home, i.e. operating the engine by controlling the exhaust brake of the vehicle by intermittently activating and deactivating said exhaust brake if the vehicle is not in a safe position.

Figure 8:
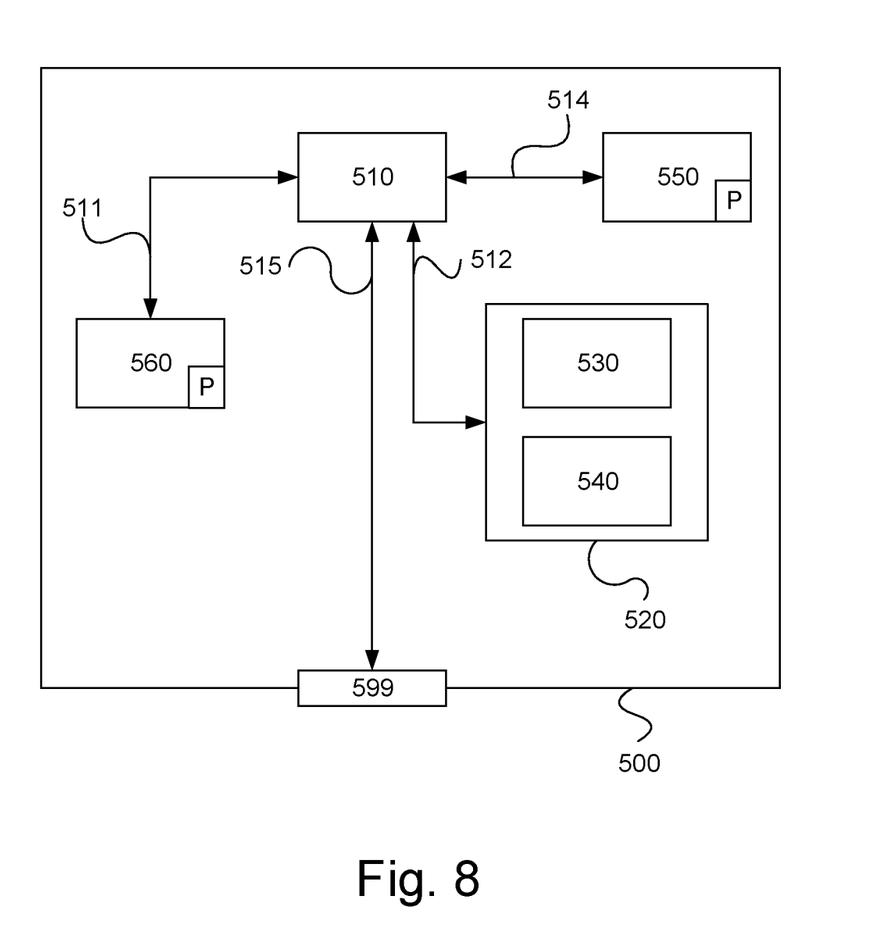
FIG. 8 schematically illustrates a computer according to an embodiment of the present invention.

With reference to FIG. 8, a diagram of an apparatus 500 is shown. The system I described with reference to FIG. 6 may according to an embodiment comprise apparatus 500. Apparatus 500 comprises a non-volatile memory 520, a data processing device 510 and a read/write memory 550. Non-volatile memory 520 has a first memory portion 530 wherein a computer program, such as an operating system, is stored for controlling the function of apparatus 500. Further, apparatus 500 comprises a bus controller, a serial communication port, I/O-means, an A/D-converter, a time date entry and transmission unit, an event counter and an interrupt controller (not shown). Non-volatile memory 520 also has a second memory portion 540.

A computer program P is provided comprising routines for controlling an internal combustion engine of a vehicle. The combustion engine comprises a cylinder having a space arranged to receive air and fuel, a piston disposed in the cylinder, and a crankcase being in fluid communication with the cylinder. A powertrain for said vehicle is configured to provide an engaged and a disengaged state. The program P comprises routines for determining an uncontrolled behavior due to fluid flow between said crankcase and said cylinder space and combustion of such fluid. The program P comprises routines for determining, if an uncontrolled behavior has been determined, whether the vehicle is in a safe position. The program P comprises routines for performing an emergency stop if the vehicle is in a safe position. The program P comprises routines for operating the engine by controlling the exhaust brake of the vehicle by intermittently activating and deactivating said exhaust brake if the vehicle is not in a safe position. The routines for operating the engine by controlling the exhaust brake of the vehicle by intermittently activating and deactivating said exhaust brake comprises routines for activating said exhaust brake at a certain high engine speed and deactivating said exhaust brake at a certain low engine speed. The routines for operating the engine by controlling the exhaust brake of the vehicle by intermittently activating and deactivating said exhaust brake comprises routines for said operation such that the engine is operated in order to move the vehicle to a safe position, wherein the routines for performing an emergency stop is performed when the vehicle is in a safe position. The routines for performing an emergency stop comprise routines for activating a throttle valve so as to stop the flow of air to said cylinder space and/or activating the exhaust brake. The routines for determining whether the vehicle is in a safe position comprises routines for determining whether the vehicle speed is below a certain speed and/or routines for determining whether the parking brake is activated and/or determining whether the ignition is deactivated. The routines for determining an uncontrolled behavior comprises routines for determining whether the powertrain is disengaged. The routines for determining an uncontrolled behavior comprises routines for determining whether the engine speed is increasing. The routines for determining an uncontrolled behavior comprises routines for determining whether said cylinder space is receiving fuel. The program P comprises routines for determining that an uncontrolled behavior is at hand if the conditions that: said powertrain is disengaged, the engine speed is increasing and said cylinder space is not receiving any fuel, are fulfilled. The program P comprises routines for determining whether the condition that the engine speed is increasing is fulfilled during a predetermined time period. The program P comprises routines for determining whether the condition that the cylinder space is not receiving any fuel is fulfilled during a predetermined time period. The program P comprises routines for determining whether the condition that the engine speed is increasing has resulted in a predetermined engine speed. The computer program P may be stored in an executable manner or in a compressed condition in a separate memory 560 and/or in read/write memory 550.

When it is stated that data processing device 510 performs a certain function it should be understood that data processing device 510 performs a certain part of the program which is stored in separate memory 560, or a certain part of the program which is stored in read/write memory 550.

Data processing device 510 may communicate with a data communications port 599 by means of a data bus 515. Non-volatile memory 520 is adapted for communication with data processing device 510 via a data bus 512. Separate memory 560 is adapted for communication with data processing device 510 via a data bus 511. Read/write memory 550 is adapted for communication with data processing device 510 via a data bus 514. To the data communications port 599 e.g. the links connected to the control units 100 may be connected.

When data is received on data port 599 it is temporarily stored in second memory portion 540. When the received input data has been temporarily stored, data processing device 510 is set up to perform execution of code in a manner described above. The signals received on data port 599 can be used by apparatus 500 for determining an uncontrolled behavior due to fluid flow between said crankcase and said cylinder space and combustion of such fluid. The signals received on data port 599 can be used by apparatus 500 for determining, if an uncontrolled behavior has been determined, whether the vehicle is in a safe position. The signals received on data port 599 can be used by apparatus 500 for performing an emergency stop if the vehicle is in a safe position. The signals received on data port 599 can be used by apparatus 500 for operating the engine by controlling the exhaust brake of the vehicle by intermittently activating and deactivating said exhaust brake if the vehicle is not in a safe position. The signals used for operating the engine by controlling the exhaust brake of the vehicle by intermittently activating and deactivating said exhaust brake are used for activating said exhaust brake at a certain high engine speed and deactivating said exhaust brake at a certain low engine speed. The signals used for operating the engine by controlling the exhaust brake of the vehicle by intermittently activating and deactivating said exhaust brake are used for said operation such that the engine is operated in order to move the vehicle to a safe position, wherein the signals used for performing an emergency stop are used when the vehicle is in a safe position. The signals used for performing an emergency stop are used for activating a throttle valve so as to stop the flow of air to said cylinder space and/or activating the exhaust brake. The signals used for determining whether the vehicle is in a safe position are used for determining whether the vehicle speed is below a certain speed and/or for determining whether the parking brake is activated and/or determining whether the ignition is deactivated. The signals used for determining an uncontrolled behavior are used for determining whether the powertrain is disengaged. The signals used for determining an uncontrolled behavior are used for determining whether the engine speed is increasing. The signals used for determining an uncontrolled behavior are used for determining whether said cylinder space is receiving fuel. The signals received on data port 599 can be used by apparatus 500 for determining that an uncontrolled behavior is at hand if the conditions that: said powertrain is disengaged, the engine speed is increasing and said cylinder space is not receiving any fuel, are fulfilled. The signals received on data port 599 can be used by apparatus 500 for determining whether the condition that the engine speed is increasing is fulfilled during a predetermined time period. The signals received on data port 599 can be used by apparatus 500 for determining whether the condition that the cylinder space is not receiving any fuel is fulfilled during a predetermined time period. The signals received on data port 599 can be used by apparatus 500 for determining whether the condition that the engine speed is increasing has resulted in a predetermined engine speed.

Parts of the methods described herein can be performed by apparatus 500 by means of data processing device 510 running the program stored in separate memory 560 or read/write memory 550. When apparatus 500 runs the program, parts of the methods described herein are executed.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. A method for controlling an internal combustion engine of a vehicle, the internal combustion engine comprising a cylinder having a space arranged to receive air and fuel, a piston disposed in the cylinder, a crankcase being in fluid communication with the cylinder, said method comprising:
   determining an uncontrolled behavior due to fluid flow between said crankcase and said cylinder space and combustion of such fluid, and if the uncontrolled behavior has been determined, said method comprising:
   determining whether the vehicle is in a safe position;
   if the vehicle is in the safe position, performing an emergency stop; and
   if the vehicle is not in the safe position, operating the internal combustion engine in order to reposition the vehicle by controlling an exhaust brake of the vehicle by intermittently activating and deactivating said exhaust brake.

2. A method according to claim 1, wherein operating the internal combustion engine by controlling the exhaust brake of the vehicle by intermittently activating and deactivating said exhaust brake is performed by activating said exhaust brake at a first engine speed; and
   means for deactivating said exhaust brake at a second engine speed, where the first engine speed is a higher engine speed than the second engine speed.

3. A method according to claim 1, wherein operating the internal combustion engine by controlling the exhaust brake of the vehicle by intermittently activating and deactivating said exhaust brake is performed such that the internal combustion engine is operated to move said vehicle to the safe position, wherein performing an emergency stop is performed when the vehicle is in the safe position.

4. A method according to claim 1, wherein performing an emergency stop comprises activating a throttle valve so as to stop a flow of air to said cylinder space and/or activating the exhaust brake.

5. A method according to claim 1, wherein determining whether the vehicle is in a safe position comprises determining whether a current speed of the vehicle is below a selected speed and/or determining whether a parking brake of the vehicle is activated and/or means for determining whether an ignition of the vehicle is deactivated.

6. A method according to claim 1, wherein determining an uncontrolled behavior comprises:

determining whether a powertrain of the vehicle is disengaged;
determining whether a current speed of the internal combustion engine is increasing;
determining whether said cylinder space is receiving fuel;
determining an uncontrolled behavior is occurring if: said powertrain is disengaged, the current speed of the internal combustion engine is increasing and said cylinder space is not receiving any fuel.

7. A system for controlling an internal combustion engine of a vehicle, the internal combustion engine comprising a cylinder having a space arranged to receive air and fuel, a piston disposed in the cylinder, a crankcase being in fluid communication with the cylinder, the system comprising:
means for determining an uncontrolled behavior due to fluid flow between said crankcase and said cylinder space and combustion of such fluid, wherein said means comprises:
means for determining whether the vehicle is in a safe position;
means for performing an emergency stop if the vehicle is in the safe position; and
means for operating the internal combustion engine in order to reposition the vehicle by controlling an exhaust brake of the vehicle by intermittently activating and deactivating said exhaust brake, if the vehicle is not in the safe position.

8. A system according to claim 7, wherein the means for operating the internal combustion engine by controlling the exhaust brake of the vehicle by intermittently activating and deactivating said exhaust brake comprises:
means for activating said exhaust brake at a first engine speed; and
means for deactivating said exhaust brake at a second engine speed, where the first engine speed is a higher engine speed than the second engine speed.

9. A system according to claim 7, wherein the means for operating the internal engine by controlling the exhaust brake of the vehicle by intermittently activating and deactivating said exhaust brake is arranged to be performed such that the internal combustion engine is operated to move the vehicle to the safe position, wherein the means for performing an emergency stop is arranged to be activated when the vehicle is in the safe position.

10. A system according to claim 7, wherein the means for performing an emergency stop comprises means for activating a throttle valve so as to stop a flow of air to said cylinder space and/or means for activating the exhaust brake.

11. A system according to claim 7, wherein the means for determining whether the vehicle is in a safe position comprise means for determining whether a current speed of the vehicle is below a selected speed and/or means for determining whether a parking brake of the vehicle is activated and/or means for determining whether an ignition of the vehicle is deactivated.

12. A system according to claim 7, wherein the means for determining an uncontrolled behavior comprises:
means for determining whether a powertrain of the vehicle is disengaged;
means for determining whether a current speed of the internal combustion engine is increasing;
means for determining whether said cylinder space is receiving fuel; and
means for determining that an uncontrolled behavior is occurring if: said powertrain is disengaged, the current speed of the internal combustion engine is increasing and said cylinder space is not receiving any fuel.

13. A vehicle comprising a system for controlling an internal combustion engine of a vehicle, the internal combustion engine comprising a cylinder having a space arranged to receive air and fuel, a piston disposed in the cylinder, a crankcase being in fluid communication with the cylinder, the system comprising:
means for determining an uncontrolled behavior due to fluid flow between said crankcase and said cylinder space and combustion of such fluid, wherein said means comprises:
means for determining whether the vehicle is in a safe position;
means for performing an emergency stop if the vehicle is in the safe position; and
means for operating the internal combustion engine in order to reposition the vehicle by controlling an exhaust brake of the vehicle by intermittently activating and deactivating said exhaust brake, if the vehicle is not in the safe position.

14. A computer program product stored on a non-transitory computer-readable medium, said computer program product for controlling an internal combustion engine of a vehicle, the internal combustion engine comprising a cylinder having a space arranged to receive air and fuel, a piston disposed in the cylinder, a crankcase being in fluid communication with the cylinder, said computer program product comprising computer instructions to cause one or more electronic control units or computers to perform the following operations:
determining an uncontrolled behavior due to fluid flow between said crankcase and said cylinder space and combustion of such fluid, and if an uncontrolled behavior has been determined, said computer program product comprising computer instructions to cause one or more electronic control units or computers to:
determining whether the vehicle is in a safe position;
if the vehicle is in the safe position, performing an emergency stop; and
if the vehicle is not in the safe position, operating the internal combustion engine in order to reposition the vehicle by controlling an exhaust brake of the vehicle by intermittently activating and deactivating said exhaust brake.

* * * * *